(12) United States Patent
Mutikainen et al.

(10) Patent No.: US 9,538,360 B2
(45) Date of Patent: Jan. 3, 2017

(54) APPARATUS, METHOD AND COMPUTER-READABLE STORAGE MEDIUM FOR REGISTERING USER IDENTITIES

(75) Inventors: Jari Mutikainen, Lepsama (FI);
Miikka Poikselka, Espoo (FI);
Markku Tuohino, Espoo (FI)

(73) Assignee: Nokia Technologies Oy, Espoo (FI)

( * ) Notice: Subject to any disclaimer, the term of this patent is extended or adjusted under 35 U.S.C. 154(b) by 765 days.

(21) Appl. No.: 12/811,071

(22) PCT Filed: Dec. 19, 2008

(86) PCT No.: PCT/IB2008/055473
§ 371 (c)(1),
(2), (4) Date: Jun. 28, 2010

(87) PCT Pub. No.: WO2009/083888
PCT Pub. Date: Jul. 9, 2009

(65) Prior Publication Data
US 2010/0290456 A1     Nov. 18, 2010

Related U.S. Application Data

(60) Provisional application No. 61/016,931, filed on Dec. 27, 2007.

(51) Int. Cl.
*H04L 12/66*     (2006.01)
*H04W 8/04*     (2009.01)
(Continued)

(52) U.S. Cl.
CPC .......... *H04W 8/04* (2013.01); *H04L 29/12103* (2013.01); *H04L 29/12594* (2013.01);
(Continued)

(58) Field of Classification Search
CPC ..................... H04L 29/12103; H04L 29/12594
(Continued)

(56) References Cited

U.S. PATENT DOCUMENTS 7,177,642 B2    2/2007   Sanchez et al.
2005/0136926 A1*   6/2005   Tammi et al. ............. 455/435.1
(Continued)

FOREIGN PATENT DOCUMENTS

WO     2006077587 A2     7/2006

OTHER PUBLICATIONS

International Search Report and Written Opinion of the International Searching Authority for PCT/IB2008/055473 dated Jun. 22, 2009, pp. 1-9.
(Continued)

*Primary Examiner* — Parth Patel
(74) *Attorney, Agent, or Firm* — Mintz Levin Cohn Ferris Glovsky and Popeo, P.C.

(57) ABSTRACT

An apparatus is provided that includes a processor configured to maintain a first implicit registration set for a first apparatus, where the first implicit registration set includes a first identity unique to the first apparatus and a shared identity. The processor is also configured to maintain a second implicit registration set for a second apparatus, where the second implicit registration set includes a second identity unique to the second apparatus and the shared identity. In this regard, the first and second implicit registration sets may be maintained to enable registration of the first and second apparatuses with a network such that each of the first and second apparatuses are configured to receive communication requests to the respective first and second identities, and such that both of the first and second apparatuses are configured to receive communication requests to the shared identity.

20 Claims, 7 Drawing Sheets

(51) Int. Cl.
　　　*H04L 29/12*　　　(2006.01)
　　　*H04L 29/08*　　　(2006.01)
　　　*H04W 80/10*　　　(2009.01)

(52) U.S. Cl.
　　　CPC ...... *H04L 61/1535* (2013.01); *H04L 61/3085* (2013.01); *H04L 61/3095* (2013.01); *H04L 67/14* (2013.01); *H04L 67/147* (2013.01); *H04L 61/308* (2013.01); *H04W 80/10* (2013.01)

(58) Field of Classification Search
　　　USPC .................................. 709/228; 370/352, 228
　　　See application file for complete search history.

(56) References Cited

U.S. PATENT DOCUMENTS

| | | | |
|---|---|---|---|
| 2010/0232422 A1* | 9/2010 | Blanco et al. | 370/352 |
| 2011/0124339 A1* | 5/2011 | Alriksson et al. | 455/435.1 |
| 2012/0219127 A1* | 8/2012 | Lu et al. | 379/88.17 |

OTHER PUBLICATIONS

Ericsson, "Further Analysis of Emergency Cells", 3GPP TSG SA WG2 Meeting #60, TD S2-074231, Kobe, Japan, Oct. 8-12, 2007, pp. 1-2.

3GPP TS 23.228 v.7.7.0 (Mar. 2007), Technical Specification, "Technical Specification Group Services and System Aspects; IP Multimedia Subsystem (IMS); Stage 2 (release 7)", pp. 1-223.

3GPP TS 23.003 v.7.3.0 (Mar. 2007), Technical Specification, "Technical Specification Group Core Network and Terminals; Numbering, addressing and identification (release 7)", pp. 1-53.

3GPP TR 23.892 V.8.0.1 (Mar. 2008) Technical Report, "Technical Specification Group Services and System Aspects; IP Multimedia Subsystem (IMS) centralized services (Release 8)", pp. 1-167.

3GPP TS 24.229 V5.0.0 (Mar. 2002) Technical Specification, "Technical Specification Group Core Network; IP Multimedia Call Control Protocol based on SIP and SDP; Stage 3 (Release 5)", pp. 1-134.

3GPP TS 29.228 v.7.7.0 (Oct. 2007), Technical Specification, "Multimedia (IM) Subsystem Cx and Dx Interfaces; Signalling flows and message contents (release 7)", Annex A and B.

\* cited by examiner

| EVENT | IMPI | IMPU | REG STATUS |
|---|---|---|---|
| 1. | T-IMPI1 | T-IMPU1 | NOT REGISTERED |
| 2. | T-IMPI1 | T-IMPU1 | T-IMPU1: BARRED, IMPU1: REG, IMPU3: REG |
| 3. | T-IMPI1 | IMPU1, IMPU3 | T-IMPU1: BARRED, IMPU1: REG, IMPU3: REG |
| 10. | T-IMPI2 | T-IMPU2 | NOT REGISTERED |
| 11. | T-IMPI2 | T-IMPU2 | T-IMPU2: BARRED, IMPU2: REG, IMPU3: REG |
| 12. | T-IMPI2 | IMPU2, IMPU3 | T-IMPU2: BARRED, IMPU2: REG, IMPU3: REG |

| EVENT | IMPI | IMPU | REG STATUS |
|---|---|---|---|
| 20. | T-IMPI1 | T-IMPU1 | IMPU1, IMPU3: REG |
| 21. | T-IMPI1 | T-IMPU1 | IMPU1: NOT REG |
| 22. | T-IMPI1 | IMPU1, IMPU3 | T-IMPU1: BARRED, IMPU1: NOT REG, T-IMPI1 & IMPU3: NOT REG* |
| 30. | T-IMPI2 | T-IMPU2 | IMPU2, IMPU3: REG |
| 31. | T-IMPI2 | T-IMPU2 | IMPU2: NOT REG, IMPU3: NOT REG |
| 32. | T-IMPI2 | T-IMPU2 | IMPU2: NOT REG, T-IMPI2 & IMPU3: NOT REG |

* IMPU3 STILL REGISTERED FOR TERMINAL 2 (CONTACT ADDR2)

APPARATUS, METHOD AND COMPUTER-READABLE STORAGE MEDIUM FOR REGISTERING USER IDENTITIES

RELATED APPLICATION

This application was originally filed as PCT Application No. PCT/IB2008/055473 filed Dec. 19, 2008, which claims priority benefit to U.S. Provisional Patent Application No. 61/016,931, filed Dec. 27, 2007.

TECHNOLOGICAL FIELD

Exemplary embodiments of the present invention generally relate to systems and methods of identifying users, such as in an IP Multimedia Subsystem (IMS), and more particularly, relate to systems and methods for identifying multiple users, such as in an IMS.

BACKGROUND

Wireless networks are evolving from circuit-switched networks (e.g., global system for mobile communications (GSM), IS-136, IS-95) to packet-switched networks (e.g., wireless local area network (WLAN), Universal Mobile Telephone System (UMTS), cdma2000) configured to support multimedia applications to mobile end-users over Internet protocol (IP). General Packet Radio Service (GPRS), which is an evolution of GSM, may support packet data (e.g., web browsing, email) in a cellular environment. Further evolution of GPRS, often referred to as the UMTS, is expected to support real-time multimedia over IP (e.g., voice over IP (VoIP), video over IP, streaming media) in a cellular environment. In addition, the Third Generation Partnership Project (3GPP) has specified the IP Multimedia Subsystem (IMS) in UMTS to accomplish the control and service functions of wireless IP multimedia. In this regard, the 3rd Generation Partnership Project (3GPP) has adopted Session Initiation Protocol (SIP) as the signaling protocol in IMS. At the same time, in the cdma2000 world, the 3GPP2 has been developing the IMS, formerly referred to as the IP Multimedia Domain (MMD), to implement the control and service functions of wireless IP multimedia. The 3GPP2 has also adopted SIP into the IMS specification.

And although the IMS provides a number of enhanced features in the provision of IP-based telephony and multimedia services, it is generally desirable to improve upon existing techniques.

BRIEF SUMMARY

In light of the foregoing background, exemplary embodiments of the present invention provide an improved apparatus, method and computer program product for registering user identities, such as in an IMS. As indicated above and explained below, the system and method of exemplary embodiments of the present invention may address at least some of the issues identified by prior techniques and may provide additional benefits.

According to one aspect of an exemplary embodiment of the present invention, an apparatus is provided that includes a processor configured to maintain a first implicit registration set for a first apparatus, where the first implicit registration set includes a first identity unique to the first apparatus and a shared identity. The processor is also configured to maintain a second implicit registration set for a second apparatus, where the second implicit registration set includes a second identity unique to the second apparatus and the shared identity. In this regard, the first and second implicit registration sets may be maintained to enable registration of the first and second apparatuses with a network such that each of the first and second apparatuses are configured to receive communication requests to the respective first and second identities, and such that both of the first and second apparatuses are configured to receive communication requests to the shared identity.

The first and second identities, and the shared identity, may each comprise an IP Multimedia Subsystem (IMS) identity, and the first and second implicit registration sets may be maintained to enable registration of the first and second apparatuses with an IMS network. In such instances, the first and second apparatuses may be associated with respective, unique first and second circuit-switched network identities, where the first identity may include the first circuit-switched network identity in the form of an IMS identity, and the second identity may include the second circuit-switched network identity in the form of an IMS identity. Also in such instances, the first and second apparatuses may be further configured to receive communication requests to the respective, unique first and second circuit-switched network identities.

The processor may be further configured to receive a register information flow from the first apparatus and, in response thereto, register the first apparatus with the network including being configured to bind the first identity and the shared identity to the first apparatus. Similarly, the processor may be configured to receive a register information flow from the second apparatus and, in response thereto, register the second apparatus with the network including being configured to bind the second identity and the shared identity to the second apparatus. In these instances, the identities may be more particularly bound to respective signaling-protocol contact addresses of the first and second apparatuses.

The processor may be further configured to receive a de-register information flow from the first apparatus or second apparatus. And in response to the de-register information flow, the processor may be configured to de-register the respective first apparatus or second apparatus with the network including being configured to un-bind the respective first identity or second identity and the shared identity from the respective first apparatus or second apparatus. In this instance, the shared identity may remain bound to the other of the first apparatus or second apparatus.

Once the first and second apparatuses are registered, the processor may be further configured to receive a communication request intended for the shared identity. In response to the communication request, then, the processor may be configured to forward or otherwise fork the communication request to both the first and second apparatuses such that both of the first and second apparatuses receive the communication request at approximately the same time.

According to another aspect of some embodiments of the present invention, a method is provided that includes maintaining a first implicit registration set for a first apparatus, where the first implicit registration set includes a first identity unique to the first apparatus and a shared identity. The method also includes maintaining a second implicit registration set for a second apparatus, where the second implicit registration set includes a second identity unique to the second apparatus and the shared identity. As indicated above, the first and second implicit registration sets may be maintained to enable registration of the first and second apparatuses with a network such that each of the first and second apparatuses are configured to receive communication requests to the respective first and second identities, and such that both of the first and second apparatuses are configured to receive communication requests to the shared identity.

According to yet another aspect of some embodiments of the present invention, a computer-readable storage medium is provided, where the computer-readable storage medium has computer-readable program code portions stored therein. The computer-readable program code portions include a first program code portion including a first implicit registration set for a first apparatus, where the first implicit registration set includes a first identity unique to the first apparatus and a shared identity. A second program code portion includes a second implicit registration set for a second apparatus, where the second implicit registration set includes a second identity unique to the second apparatus and the shared identity. Similar to before, the first and second implicit registration sets may be stored in the computer-readable storage medium to enable registration of the first and second apparatuses with a network such that each of the first and second apparatuses are configured to receive communication requests to the respective first and second identities, and such that both of the first and second apparatuses are configured to receive communication requests to the shared identity.

Exemplary embodiments of the present invention therefore provide an improved apparatus, method and computer program product for registering user identities, such as in an IMS. As indicated above, and explained below, exemplary embodiments of the present invention may solve problems identified by prior techniques and provide additional advantages.

BRIEF DESCRIPTION OF THE DRAWINGS

Figure 1:
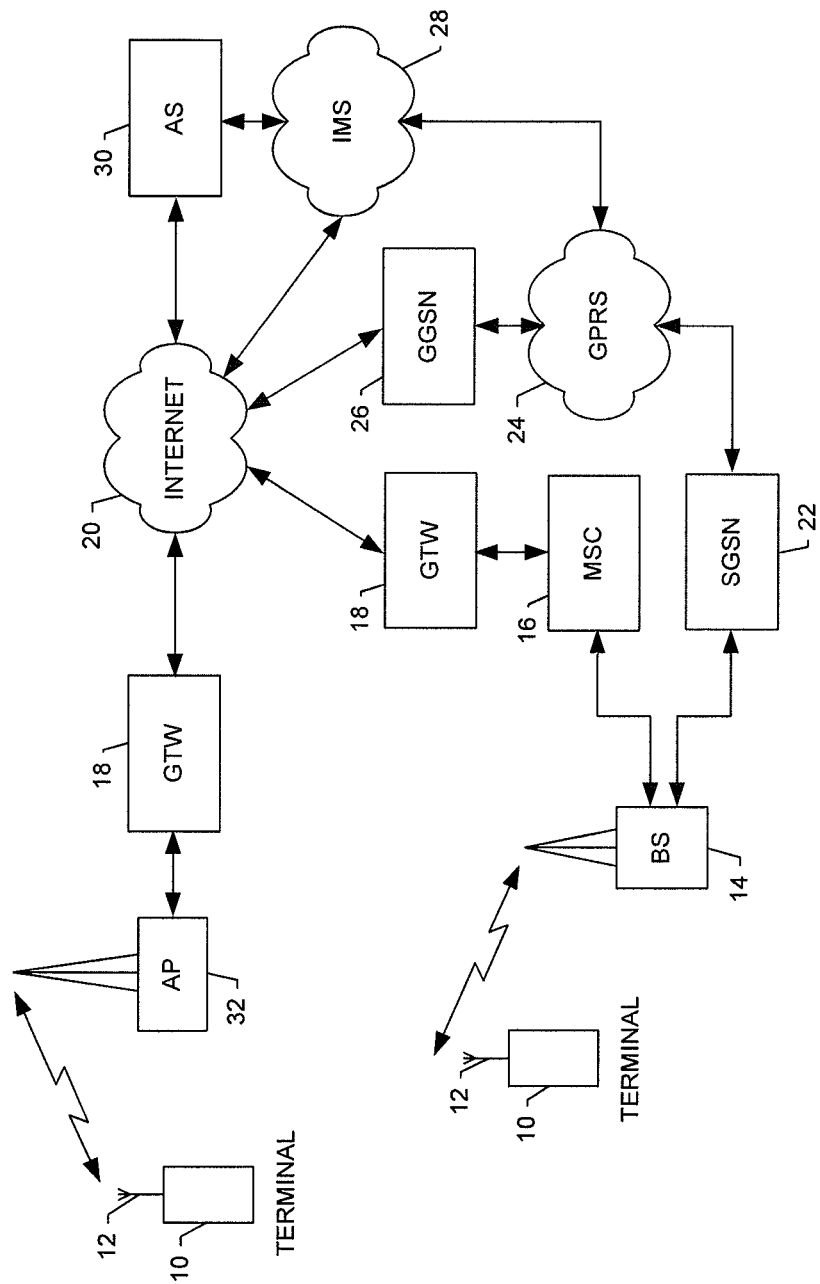
Figure 2:
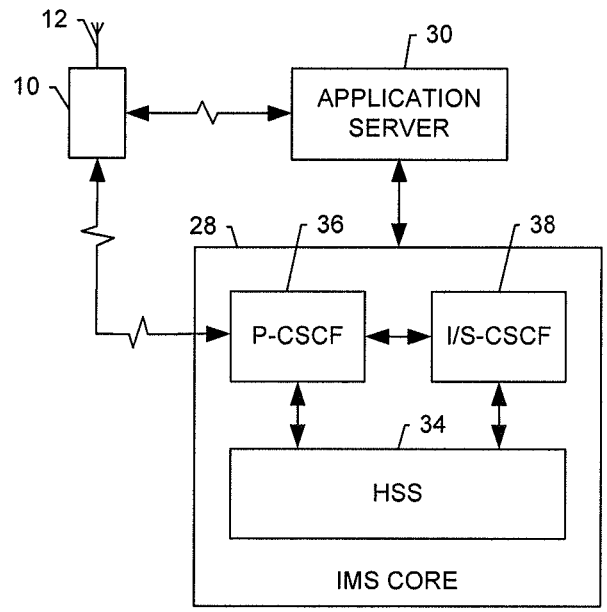
Figure 3:
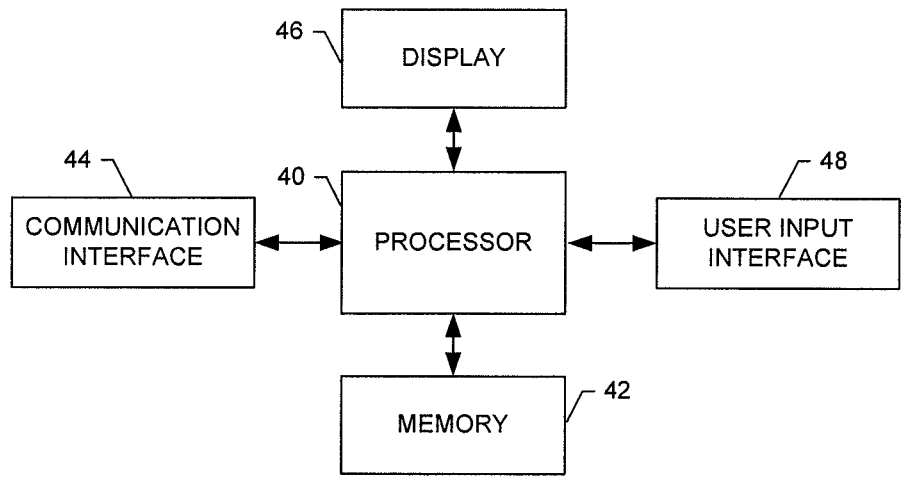
Figure 4:
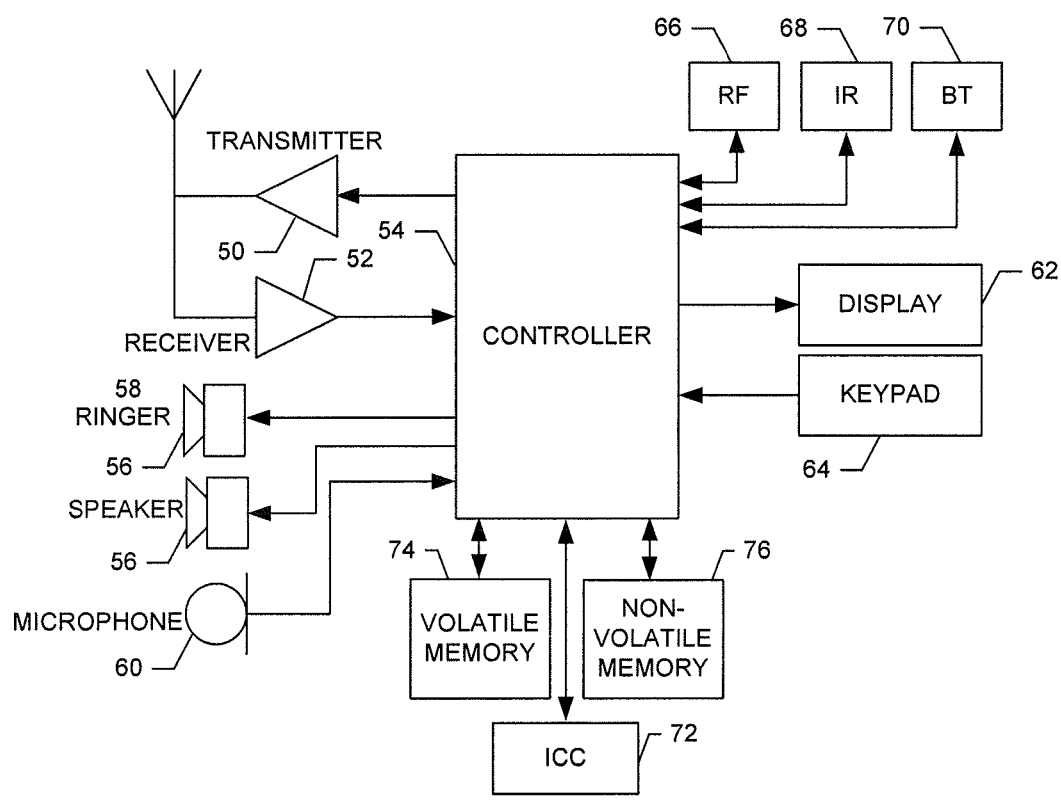
Figure 5:
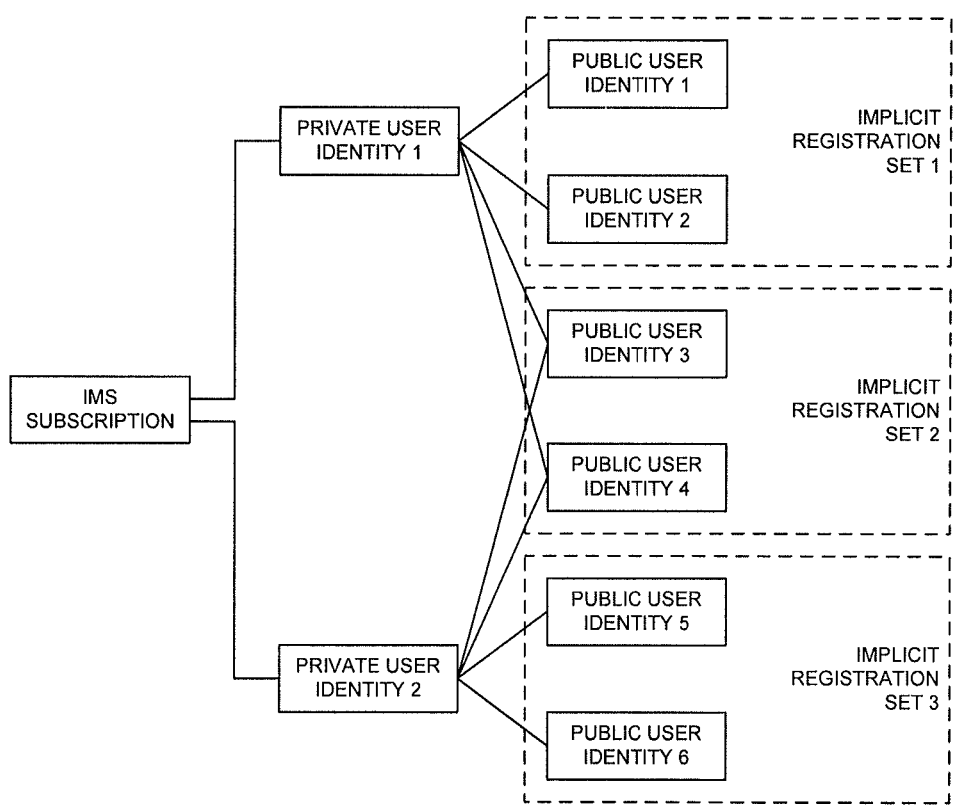
Figure 6:
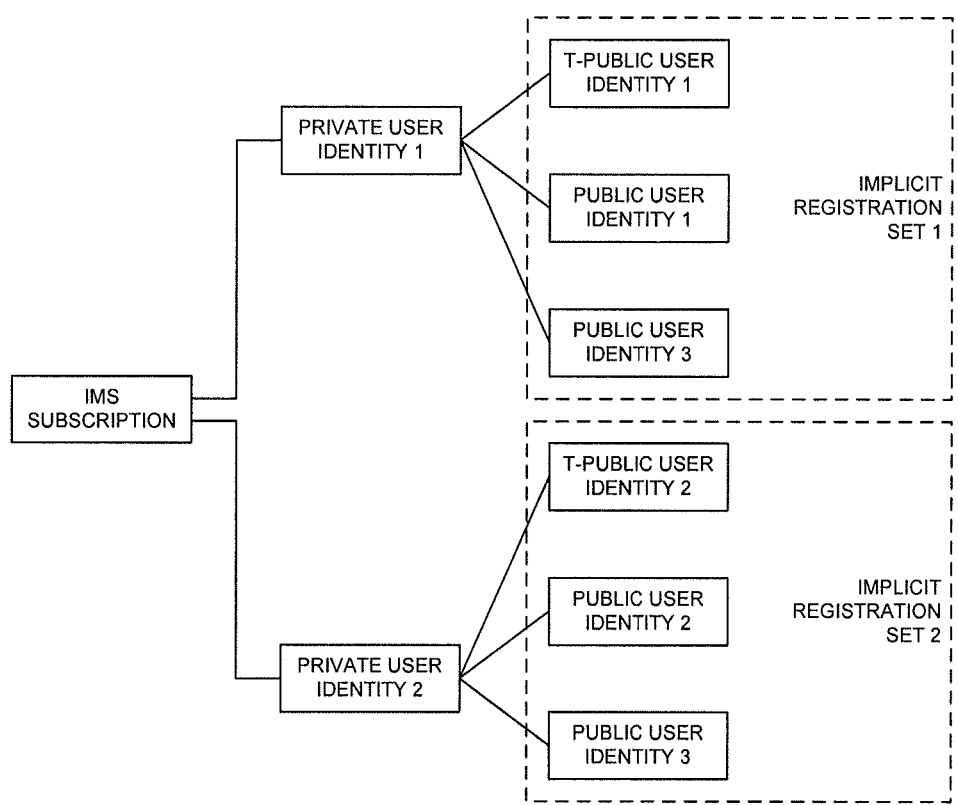
Figure 7:
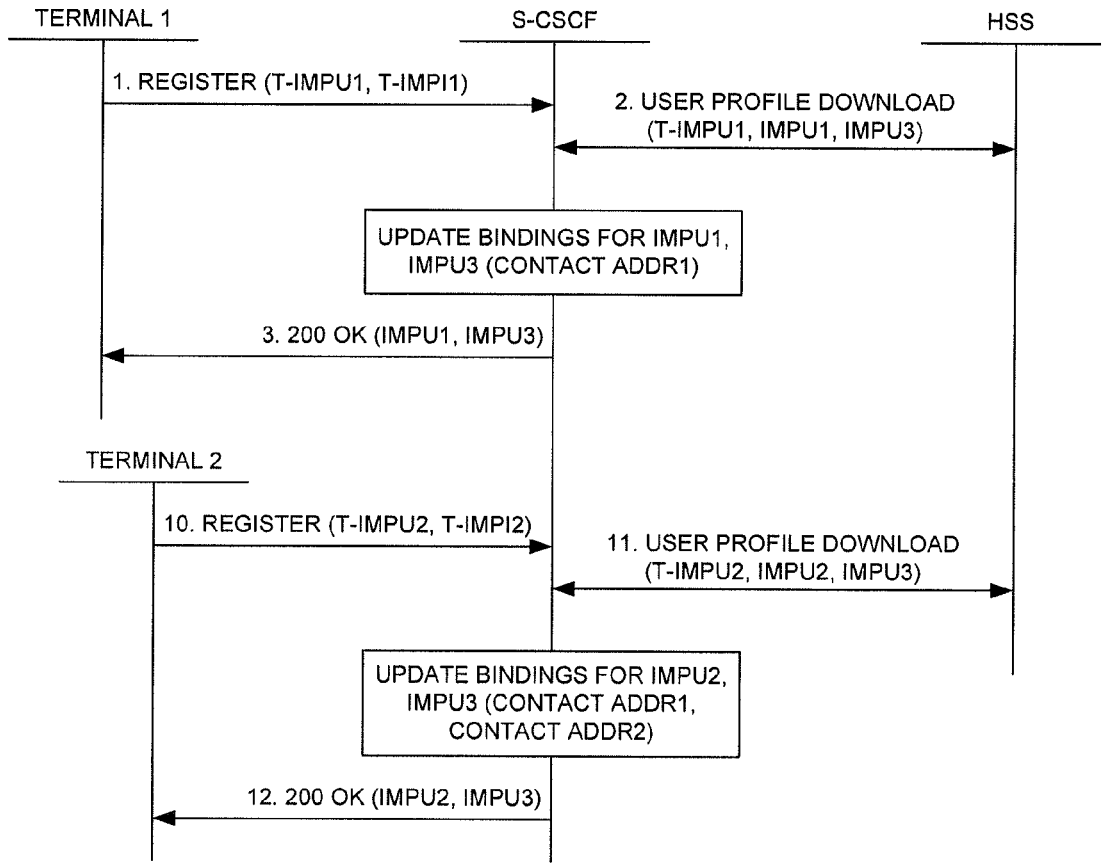
Figure 8:
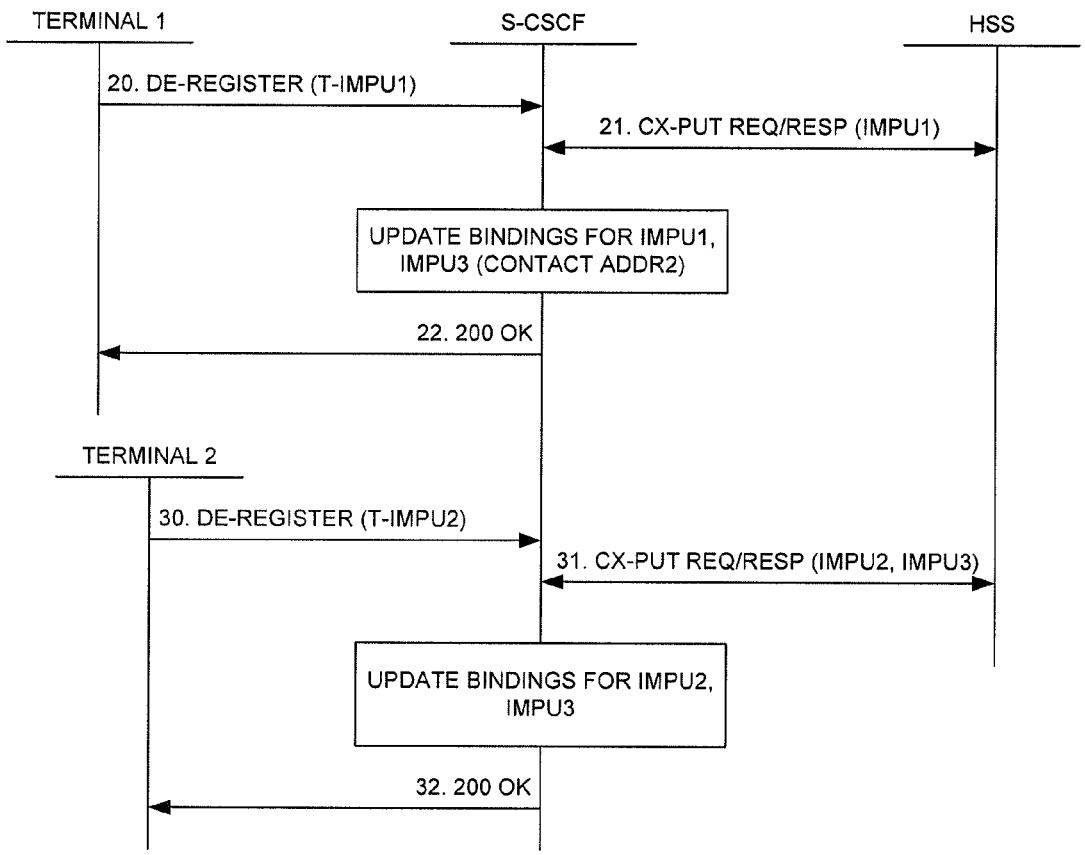

Having thus described the invention in general terms, reference will now be made to the accompanying drawings, which are not necessarily drawn to scale, and wherein:

FIG. 1 is a schematic block diagram of a wireless communications system, including an IP Multimedia Subsystem (IMS), according to one exemplary embodiment of the present invention;

FIG. 2 is a schematic block diagram of an IP Multimedia Subsystem (IMS), according to one exemplary embodiment of the present invention;

FIG. 3 is a schematic block diagram of an entity configured to operate as one or more of a terminal or one or more servers of an IMS, in accordance with exemplary embodiments of the present invention;

FIG. 4 is a more particular schematic block diagram of a terminal, according to exemplary embodiments of the present invention;

FIG. 5 is an illustration of the relationship between an IMS subscription and its private and public user identities, including implicit registration sets, according to exemplary embodiments of the present invention;

FIG. 6 is an illustration of the relationship between the user identities that may result for the IMS subscription for an exemplary user, according to exemplary embodiments of the present invention; and FIGS. 7 and 8 are control flow diagrams illustrating various operations in registering and de-registering multiple terminals in an IMS, according to exemplary embodiments of the present invention.

DETAILED DESCRIPTION

Some embodiments of the present invention now will be described more fully hereinafter with reference to the accompanying drawings, in which preferred embodiments of the invention are shown. Embodiments of this invention may, however, be embodied in many different forms and should not be construed as limited to the embodiments set forth herein; rather, these embodiments are provided so that this disclosure will be thorough and complete, and will fully convey the scope of embodiments of the invention to those skilled in the art. Like numbers refer to like elements throughout.

Referring to FIG. 1, an illustration of one type of system that may benefit from exemplary embodiments of the present invention is provided. The system, method and computer program product of exemplary embodiments of the present invention will be primarily described in conjunction with mobile communications applications. It should be understood, however, that the system, method and computer program product of exemplary embodiments of the present invention may be utilized in conjunction with a variety of other applications, both in the mobile communications industries and outside of the mobile communications industries. For example, the system, method and computer program product of exemplary embodiments of the present invention may be utilized in conjunction with wireline and/or wireless network (e.g., Internet) applications.

As shown, the system may include one or more terminals 10 (at times referred to as "user equipment"—UE), each having an antenna 12 for transmitting signals to and for receiving signals from one or more base stations (BSs) 14. The base station is a part of one or more mobile (e.g., cellular) networks that each includes elements used to operate the network, such as for example one or more mobile switching centers (MSC) 16. As well known to those skilled in the art, the mobile network may also be referred to as a Base Station/MSC/Interworking function (BMI). In operation, the MSC may be configured to route calls, data or the like to and from terminals when those terminals are making and receiving calls, data or the like. The MSC may also provide a connection to landline trunks when terminals are involved in a call.

The MSC 16 may be coupled to a data network, such as a local area network (LAN), a metropolitan area network (MAN), and/or a wide area network (WAN). The MSC may be directly coupled to the data network. In one typical embodiment, however, the MSC is coupled to a Gateway (GTW) 18, and the GTW is coupled to a WAN, such as the Internet 20. In turn, devices such as processing elements (e.g., personal computers, server computers or the like) may be coupled to the terminal 10 via the Internet. For example, as explained below, the processing elements may include one or more processing elements associated with one or more routing servers, event servers, personal computer (PC) systems or the like. As will be appreciated, the processing elements may comprise any of a number of processing devices, systems or the like configured to operate in accordance with exemplary embodiments of the present invention.

In addition to or in lieu of the cellular network, the BS 14 may be part of a packet-switched network, such as a GPRS network. In this regard, the BS may be coupled to a serving GPRS (General Packet Radio Service) support node (SGSN) 22. As known to those skilled in the art, the SGSN is typically configured to perform functions similar to the MSC 16 for packet switched services. The SGSN, like the MSC, may be coupled to a data network, such as the Internet 20. The SGSN may be directly coupled to the data network. In a more typical embodiment, however, the SGSN is coupled to a packet-switched core network, such as a GPRS core network 24. The packet-switched core network is then coupled to another GTW, such as a GTW GPRS support node (GGSN) 26, and the GGSN is coupled to the Internet.

The GGSN 26 and Internet 20 may be coupled to a IP multimedia subsystem (IMS) that includes various entities for the provision of IP-based telephony and multimedia services, such as in a manner defined by the third generation partnership project (3GPP). As shown, for example, the IMS may include an IMS core 28, and one or more application servers (AS) 30 each of which may be configured to host one or more IMS-based services.

Although not every element of every possible network is shown and described herein, it should be appreciated that the terminal 10 may be coupled to one or more of any of a number of different networks. For example, the IMS core 28 may be accessible by one or more terminals resident in different types of IP-CANs (IP-Connectivity Access Networks), such as for example GPRS, I-WLAN, xDSL, cable access (PacketCable DOCSIS Data Over Cable Service Interface Specification). However, all different types of IP-CAN are not shown in FIG. 1.

Further, mobile network(s) may be configured to support communication in accordance with any one or more of a number of first-generation (1G), second-generation (2G), 2.5G and/or third-generation (3G) mobile communication protocols or the like, such as so-called fourth or further-generation networks (e.g., Long-Term Evolution—LTE) where applicable. More particularly, one or more terminals may be coupled to one or more networks configured to support communication in accordance with 2G wireless communication protocols IS-136 (e.g. time division multiple access (TDMA)), GSM, and IS-95 (e.g., code division multiple access (CDMA)). Also, for example, one or more of the network(s) may be configured to support communication in accordance with 2.5G wireless communication protocols GPRS, Enhanced Data GSM Environment (EDGE), or the like. In addition, for example, one or more of the network(s) may be configured to support communication in accordance with 3G wireless communication protocols such as cdma2000, UMTS network employing Wideband Code Division Multiple Access (WCDMA) radio access technology, or the like. An example of a further-generation technology is the so-called Long-Term Evolution (LTE) currently under preparation. Some narrow-band AMPS (NAMPS), as well as total access communication system (TACS), network(s) may also benefit from exemplary embodiments of the present invention, as should dual or higher mode terminals (e.g., digital/analog or TDMA/CDMA/analog phones).

One or more terminals 10 (as well as one or more processing elements, although not shown as such in FIG. 1) may further be coupled to one or more wireless access points (APs) 32. The APs may be configured to communicate with the terminal in accordance with techniques such as, for example, radio frequency (RF), Bluetooth (BT), infrared (IrDA) or any of a number of different wireless networking techniques, including WLAN techniques. The APs may be coupled to the Internet 20. Like with the MSC 14, the AP's may be directly coupled to the Internet. In one embodiment, however, the APs are indirectly coupled to the Internet via a GTW 18. As will be appreciated, by directly or indirectly connecting the terminals, processing elements and/or any of a number of other devices to the Internet, whether via the APs or the cellular or packet-switched network(s), the terminals and processing elements may communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with exemplary embodiments of the present invention. Thus, use of any such terms should not be taken to limit the spirit and scope of embodiments of the present invention.

Referring to FIG. 2, the IMS is more particularly shown for providing an IMS-based service to one or more terminals 10. As explained above, the IMS may include one or more application servers 30 for hosting one or more IMS-based services. These application servers may include, for example, one or more push-to-talk over cellular (PoC) servers configured to host a PoC service, also known as PTT, push-to-talk service or the like. In this regard, the PoC servers may include a controlling PoC server generally configured to provide centralized PoC session handling and media distribution, and one or more participating PoC servers generally configured to provide session handling, such as SIP session handling on behalf of terminals, as well as media relay functions between terminals and a controlling PoC server.

To connect the terminals 10 to the application servers 30, the IMS includes an IMS core 28 including a number of network entities known as servers. As shown, for example, the IMS core may include a home subscriber server (HSS) 34 configured to function as a master database for a given user (terminal user), including subscription-related information to support network entities handling IMS-based calls/sessions. In this regard, the IMS core may also include a number of call session (or state) control functions (CSCFs) to handle different functions. The CSCFs may, in turn, be divided into various categories such as a proxy CSCF (P-CSCF) 36 and an interrogating/serving CSCF (I/S-CSCF) 38. Briefly, the P-CSCF provides the terminals with a gateway or entry point into the IMS core. The I/S-CSCF, which may alternatively comprise separate entities, operates as the authentication contact point within the IMS core for connections to terminals (the interrogating function), and performs the session control services for the terminals, providing the call intelligence and business logic (the serving function).

The signaling between the terminals 10 and the appropriate CSCFs 36, 38 may be routed via a radio access network, such as the GPRS network or backbone (core network) 24. The user plane session set-up signaling for a terminal may be routed via and controlled by the application servers 30 (e.g., PoC servers). That is, the application servers may control both the control plane and the user plane of the terminal. It shall be appreciated that the control plane traffic between the terminal and the application servers may be routed via the IMS core 28, such as in accordance with SIP. The user plane traffic between the terminal and the application server, on the other hand, may be routed from the radio access (e.g., GPRS) network to the application server, such as in accordance with the respective radio access network.

Referring now to FIG. 3, a block diagram of an apparatus configured to operate as one or more of the network entities shown in FIGS. 1 and 2, including one or more of a terminal 10, application server 32, HSS 34, P-CSCF 36 or I/S-CSCF 38, is shown in accordance with one exemplary embodiment of the present invention. Although shown as separate entities, in some embodiments, an apparatus may support more than one network entity, logically separated but co-located within the apparatus. For example, a single apparatus may support a logically separate, but co-located, HSS, P-CSCF and/or I/S-CSCF.

The entity that may be configured to operate as one or more of the network entities shown in FIGS. 1 and 2 includes various means for performing one or more functions in accordance with exemplary embodiments of the present invention, including those more particularly shown and described herein. It should be understood, however, that one or more of the entities may include alternative means for performing one or more like functions, without departing from the spirit and scope of embodiments of the present invention. More particularly, for example, as shown in FIG. 2, the entity may include a processor 40 connected to a memory 42. The memory may comprise volatile and/or non-volatile memory. The non-volatile memory may comprise embedded and/or may be removable non-volatile memory, and may include, for example, embedded or removable multimedia memory cards (MMCs), Memory Sticks manufactured by Sony Corporation, Electrically Erasable Programmable Read-Only Memory (EEPROM), flash memory, hard disk, optoelectronic, holographic memory or the like. The memory typically stores content, data or the like. For example, the memory may store content transmitted from, and/or received by, the entity. Also for example, the memory typically stores software applications, instructions or the like for the processor to perform functions associated with operation of the entity in accordance with exemplary embodiments of the present invention.

Although described herein as being implemented in software application(s), it should be understood that any one or more of the functions described herein may alternatively be implemented in firmware or hardware, without departing from the spirit and scope of embodiments of the present invention. Generally, then, a network entity according to exemplary embodiments of the present invention may include one or more logic elements for performing various functions. As will be appreciated, the logic elements may be embodied in any of a number of different manners. In this regard, the logic elements performing the respective functions may be embodied in an integrated circuit assembly including one or more integrated circuits integral or otherwise in communication with a respective network entity or more particularly, for example, a processor 40 of the respective network entity.

In addition to the memory 42, the processor 40 may also be connected to at least one interface or other means for displaying, transmitting and/or receiving data, content or the like. In this regard, the interface(s) may include at least one communication interface 44 or other means for transmitting and/or receiving data, content or the like, as well as at least one user interface that may include a display 46 and/or a user input interface 48. The user input interface, in turn, may comprise any of a number of devices allowing the entity to receive data from a user, such as a keypad, a touch display, a joystick or other input device. As more particularly explained below, for example, the user input interface may include one or more directional keys (hard and/or soft keys) for directionally selecting ordered items, such as ordered channels of content. It should be understood that not all apparatuses comprise all the elements illustrated, for example a GGSN may lack a display unit.

FIG. 4 illustrates a more particular functional block diagram of a terminal 10, according to exemplary embodiments of the invention. It should be understood, that the terminal illustrated and hereinafter described is merely illustrative of one type of terminal that would benefit from embodiments of the present invention and, therefore, should not be taken to limit the scope of embodiments of the present invention. While several embodiments of the terminal are illustrated and will be hereinafter described for purposes of example, other types of terminals, such as portable digital assistants (PDAs), pagers, laptop computers, media players and other types of voice and text communications systems, may readily employ embodiments of the present invention.

The terminal 10 may include various means for performing one or more functions in accordance with exemplary embodiments of the present invention, including those more particularly shown and described herein. It should be understood, however, that the terminal may include alternative means for performing one or more like functions, without departing from the spirit and scope of embodiments of the present invention. More particularly, for example, as shown in FIG. 3, the terminal may include a transmitter 50, a receiver 52, and a controller 54 or other processor that provides signals to and receives signals from the transmitter and receiver, respectively. These signals may include signaling information in accordance with the air interface standard of the applicable cellular system, and also user speech and/or user generated data. In this regard, the terminal may be configured to operate with one or more air interface standards, communication protocols, modulation types, and access types. More particularly, the terminal may be configured to operate in accordance with any of a number of first-generation (1G), second-generation (2G), 2.5G and/or third-generation (3G) communication protocols or the like. For example, the terminal may be configured to operate in accordance with 2G wireless communication protocols IS-136 (TDMA), GSM, IS-95 (CDMA) or the like. Also, for example, the terminal may be configured to operate in accordance with 2.5G wireless communication protocols GPRS, Enhanced Data GSM Environment (EDGE), or the like. Some narrow-band AMPS (NAMPS), as well as TACS, terminals may also benefit from embodiments of the present invention, as should dual or higher mode terminals (e.g., digital/analog or TDMA/CDMA/analog phones).

It is understood that the controller 54 may include the circuitry employed for implementing the audio and logic functions of the terminal. For example, the controller may be comprised of a digital signal processor device, a microprocessor device, and various analog to digital converters, digital to analog converters, and other support circuits. The control and signal processing functions of the terminal may be allocated between these devices according to their respective capabilities. The controller thus may also include the functionality to convolutionally encode and interleave message and data prior to modulation and transmission. The controller may additionally include an internal voice coder (VC), and may include an internal data modem (DM). Further, the controller may include the functionality to operate one or more software applications, which may be stored in memory.

The terminal may also comprise a user interface including a conventional earphone or speaker 56, a ringer 58, a microphone 60, a display 62, and a user input interface, all of which are coupled to the controller 54. The user input interface, which allows the terminal to receive data, may comprise any of a number of devices allowing the terminal to receive data, such as a keypad 64, a touch display (not shown) or other input device. In embodiments including a keypad, the keypad may include the conventional numeric (0-9) and related keys (#, *), and other keys used for operating the terminal. For example, the keypad may additionally or alternatively include directional keys (↑, →, ↓, ←) for directionally scrolling and/or selecting ordered items.

The terminal may also include one or more means for sharing and/or obtaining data from other network entities, such as those shown in FIGS. 1 and 2, in accordance with any of a number of different wireline and/or wireless techniques. For example, the terminal may include a radio frequency (RF) transceiver 66 and/or an infrared (IR) transceiver 68 such that the terminal may share and/or obtain data in accordance with radio frequency and/or infrared techniques. Also, for example, the terminal may include a Bluetooth (BT) transceiver 70 such that the terminal may share and/or obtain data in accordance with Bluetooth transfer techniques. Although not shown, the terminal may additionally or alternatively be configured to transmit and/or receive data from other network entities according to a number of different wireline and/or wireless networking techniques, including LAN and/or WLAN techniques.

The terminal may further include memory, such as an integrated circuit card (ICC) 72, which typically stores information elements related to a mobile subscriber. In one exemplary embodiment in the context of GSM and UMTS applications, for example, the ICC may comprise a universal ICC (UICC). This UICC may include a subscriber identity module (SIM) application, universal SIM (USIM) application, IMS SIM (ISIM) application or the like for accessing corresponding networks, although it should be understood that one or more of these applications may also be used to access one or more other networks. In addition to the ICC 72, the terminal may include other memory, such as volatile memory 74, and/or other non-volatile memory 76 (embedded and/or may be removable non-volatile memory). For example, the other non-volatile memory may comprise embedded or removable multimedia memory cards (MMCs), Memory Sticks manufactured by Sony Corporation, EEPROM, flash memory, hard disk or the like.

The memories 72, 74, 76 may store any of a number of pieces of information, and data, used by the terminal to implement the functions of the terminal. For example, the ICC 72 may store one or more identities that may be associated with the terminal 10 and/or a user of the terminal. For example, each user or rather user subscription within an IMS core 28 may be associated with one or more private user identities (IMPIs) and public user identities (IMPUs) assigned by a home network operator. A private identity, which may take the form of a network access identifier (NAI), may be used, for example, for Registration, Authorization, Administration and Accounting purposes. A public identity, which may be associated with a user via a private user identity, may take the form of a uniform resource identifier (URI) formatted in accordance with the sip (SIP-URI for SIP applications) or tel (tel-URI used for telephone—e.g., MSISDN—numbers) URI scheme, and may be used by any user for requesting communication with other users. Public user identities may be shared across multiple private user identities within the same IMS subscription. Hence, a particular public user identity may be simultaneously registered from multiple terminals 10 that use different private user identities.

Before a terminal 10 may access IMS services, the IMS core 28 may desire registration of one or more public user identities of the respective user. In accordance with IMS as defined by at least the 3GPP, more than one public user identity may be registered at a time through an implicit registration set. In this regard, an implicit registration set may include a group of public user identities that are registered via a single registration request. When one of the public user identities within the set is registered, all public user identities associated with the implicit registration set are registered at the same time. Similarly, when one of the public user identities within the set is de-registered, all public user identities that have been implicitly registered are de-registered at the same time. For an illustration of the relationship between an IMS subscription and its private and public user identities, including implicit registration sets, see FIG. 5.

In various instances, one or more users may have two or more terminals 10 to access both circuit-switched (CS) network services (e.g., GSM, IS-136, IS-95) and IMS-based services; and in these instances, the user(s) may desire to share one or more user identities across those terminals. These instances may arise, for example, in a so-called family number concept whereby within a family, both parents may have their own public user identities, as well as a shared, family public user identity. When using the shared, family public user identity, the aim may not be to request communication (e.g., call) with a specific person, but to any member of the family. Whoever belonging to the family can answer the communication request (e.g., call). Thus, the terminals of both parents may receive the communication request at approximately the same time (and for calls, may ring at approximately the same time). To effectuate the foregoing, exemplary embodiments of the present invention may permit an implicit registration set to register, for a user and at the same time, a number of the user's public user identities including the shared user identity. That is, exemplary embodiments of the present invention may permit a public user identity to belong to multiple implicit registration sets associated with respective private user identities. These implicit registration sets may be used in the context of a temporary public user identity.

Continuing the above scenario of sharing one or more public identities across multiple terminals 10, the public-identity configuration of each terminal may include, for each terminal, a public user identity in a circuit-switched network, and one or more public user identities in an IMS. This circuit-switched public identity (identity used in the CS domain) may comprise, for example, a Mobile Subscriber Integrated Services Digital Network (ISDN) Number—MSISDN). And the IMS public user identities may comprise, for example, a SIP-URI, tel-URI or the like. More particularly, for example, the following minimum configuration may be desired for terminals including an ICC 72 without an ISIM:

Terminal 1:
   CS: MSISDN1 (e.g., 3585012345)
   IMS: sip:234150999999999@234.15.IMSI.3gppnetwork.org; temporary IMPU1
   IMS: MSISDN1 in form of tel-URI1 (e.g., tel:+3585012345); IMPU1
   IMS: tel-URI3; shared (e.g., tel:+358507777777); IMPU3
Terminal 2:
   CS: MSISDN2 (e.g., 358505555555)
   IMS: sip:111111999999999@234.15.IMSI.3gppnetwork.org; temporary IMPU2
   IMS: MSISDN2 in form of tel-URI2 (e.g., tel:+358505555555); IMPU2
   IMS: tel-URI3; shared (e.g., tel:+358507777777); IMPU3
In the above, it should be noted that when a terminal includes an ICC without an ISIM, IMS identities may be derivable from a USIM, such as from an International Mobile Subscriber Identity (IMSI) and/or in a manner whereby each terminal generates unique identities.

Also in the above example, MSISDN1 refers to the MSISDN of terminal 1, and MSISDN2 refers to the MSISDN of terminal 2. Each terminal may be associated with a SIP-URI that may function as a temporary IMS public identity for the respective terminals (temporary IMPU1, temporary IMPU2), and may be desired for registration in accordance with SIP (requiring the registered public user identity—called "address of record" in SIP—in the format of SIP-URI). Otherwise, each terminal may be associated with a distinct public identity (IMPU1, IMPU2) in the form of a tel-URI (e.g., MSISDNs of the respective terminals); and a shared public identity (IMPU3) also in the form of a tel-URI (e.g., MSISDN shared across the terminals).

As shown from the above, then, the aforementioned user may, in some situations, require a unique circuit-switched public identity for each terminal (MSISDN1, MSISDN2), but that circuit-switched public identity may be used in the IMS (IMPU1 formed as a tel-URI of MSISDN1, and IMPU2 formed as a tel-URI of MSISDN2). This may be accomplished for each terminal by implicitly registering the respective circuit-switched public identity with the respective temporary IMS public identity. In addition, the terminals may share an IMS public user identity (IMPU3), which may be registered with a temporary IMPU. For an illustration of the relationship between the user identities that may result for the IMS subscription for this exemplary user, see FIG. 6.

Reference is now made to the control flow diagrams of FIGS. 7 and 8, which illustrate various steps in methods of registering and de-registering multiple terminals 10 (here, for example, two terminals) in an IMS, each including a unique public user identity as well as a shared public user identity, according to exemplary embodiments of the present invention. Except as otherwise explained herein, one or more steps in the methods of registering and de-registering terminals may be similar to steps in methods of registering and de-registering a terminal (or rather, UE) as described in 3GPP Technical Specification (TS) 23.228 v7.7.0, entitled: *IP Multimedia Subsystem (IMS); Stage* 2, Chapters 5.2 and 5.3; and TS 29.228 v7.7.0, entitled: *IP Multimedia (IM) Subsystem Cx and Dx Interfaces; Signalling Flows and Message Contents*, Annexes A and B; the contents of which are hereby incorporated by reference.

As shown in FIG. 7, a method of registering multiple terminals in an IMS may include a first terminal 10 initiating an IMS registration by sending a register information flow to the IMS core 28. This register information flow may include, for example, temporary public and private user identities (T-IMPU1, T-IMPI1) associated with the first terminal which, when the first terminal includes an ICC 72 without an ISIM but with a USIM, may be derived from the IMSI parameter in the USIM. During the registration process, the S-CSCF 38 of the IMS core may receive the register information flow including the derived identities, and perform a server assignment procedure with the HSS 34 with the temporary public and private user identities.

During the registration process, in the IMS core 28, the HSS 34 may have earlier checked that the public and private user identities exist in the HSS, and from this check, may know an implicit registration set (first implicit registration set) including the temporary public user identity, as well as a unique public user identity (IMPU1) and a shared public user identity (IMPU3). The HSS may then send the S-CSCF 38 a relevant user profile including the public user identities in the implicit registration set (T-IMPU1, IMPU1, IMPU3) and appropriate registration indications (noting that while IMPU1 and IMPU3 may be registered, T-IMPU1 may be barred from registration).

On receipt of the user profile, the S-CSCF 38 may perform any appropriate service control procedures, and may update bindings for the registerable public user identities (IMPU1, IMPU3) of the first terminal 10 (e.g., bindings of the public user identities to a SIP contact address of the first terminal). The S-CSCF may then send a response flow, such as a 200 OK information flow, to the first terminal. This response flow may include the public user identities registered in response to the first terminal's register information flow (IMPU1, IMPU3).

As also shown, the method may further include a second terminal 10 initiating an IMS registration by sending a register information flow to the IMS core 28. This register information flow may include, for example, temporary public and private user identities (T-IMPU2, T-IMPI2) associated with the second terminal, where those identities may similarly be derived from the IMSI parameter in the USIM. During the registration process, the S-CSCF 38 of the IMS core may receive the register information flow including the derived identities, and perform a server assignment procedure with the HSS 34 with the temporary public and private user identities.

During the registration process, in the IMS core 28, the HSS 34 may have earlier checked that the public and private user identities exist in the HSS, and from this check, may know an implicit registration set (second implicit registration set) including the temporary public user identity, as well as a unique public user identity (IMPU2) and a shared public user identity (IMPU3). The HSS may then send the S-CSCF 38 a relevant user profile including the public user identities in the implicit registration set (T-IMPU2, IMPU2, IMPU3) and appropriate registration indications (noting that while IMPU2 and IMPU3 may be registered, T-IMPU2 may be barred from registration).

On receipt of the user profile, the S-CSCF 38 may perform any appropriate service control procedures, and may update bindings for the registerable public user identities (IMPU2, IMPU3) of the first terminal 10. In this regard, the S-CSCF may bind the public user identities to a SIP contact address of the second terminal, with the shared public user identity (IMPU3) now being bound to both the first and second terminals such that any communication requested based on the shared public user identity may be forked to both the first and second terminals based on their respective contact addresses. The S-CSCF may then send a response flow, such as a 200 OK information flow, to the second terminal, where this flow may include the public user identities registered in response to the second terminal's register information flow (IMPU2, IMPU3).

At any point after registering with the IMS, the terminals may similarly de-register from the respective IMS. To de-register a terminal in an IMS according to exemplary embodiments of the present invention, the terminal may follow a process similar to that shown and described above with respect to FIG. 7, but including a registration expiration time of zero seconds in the register information flow. More particularly, as shown in FIG. 8 for example, a method of de-registering multiple terminals in an IMS may include a registered, first terminal 10 initiating an IMS de-registration by sending a de-register information flow to the IMS core 28, such as in the form of a new register information flow including a registration expiration time of zero seconds. This de-register information flow may include, for example, the temporary public user identity (T-IMPU1) associated with the first terminal which, again, may be derived from the IMSI parameter in the USIM. During the de-registration process, the S-CSCF 38 of the IMS core may receive the de-register information flow including the derived temporary public user identity, perform any appropriate service control procedures, and perform a server assignment procedure with the HSS 34 with the temporary public user identity, such as in a manner similar to that of a Cx-Put procedure described by aforementioned 3GPP TS 23.228.

During the de-registration process, in the IMS core 28, the HSS 34 may have earlier checked that the public and private user identities exist in the HSS, and from this check, may know the implicit registration set (first implicit registration set) including the temporary public user identity, as well as the unique and shared public user identities (IMPU1, IMPU3). This information may have been made available to the S-CSCF during registration of the respective temporary IMPU. Based on this information, the S-CSCF 38 may then update bindings for the registered public user identities (IMPU1, IMPU3) of the first terminal 10. In this regard, the S-CSCF may unbind the public user identities to the SIP contact address of the first terminal, the shared public user identity (IMPU3) no longer being bound to both the first and second terminals, but still being bound to the second terminal. The S-CSCF may then send a response flow, such as a 200 OK information flow, to the first terminal. It is possible that the HSS may send the S-CSCF 38 a relevant user profile including the public user identities in the implicit registration set (T-IMPU1, IMPU1, IMPU3) as a response to server assignment procedure.

As also shown, the method may further include a second terminal 10 initiating an IMS de-registration by similarly sending a de-register information flow to the IMS core 28. This de-register information flow may include, for example, the temporary public user identity (T-IMPU2) associated with the second terminal which, again, may be derived from the IMSI parameter in the USIM. During the de-registration process, the S-CSCF 38 of the IMS core may receive the de-register information flow including the derived temporary public user identity, perform any appropriate service control procedures, and perform a server assignment procedure with the HSS 34 with the temporary public user identity, such as in a manner similar to that of a Cx-Put procedure described by aforementioned 3GPP TS 23.228.

Again, during the de-registration process, in the IMS core 28, the HSS 34 may have earlier checked that the public and private user identities exist in the HSS, and from this check, may know the implicit registration set (second implicit registration set) including the temporary public user identity, as well as the unique and shared public user identities (IMPU2, IMPU3). This information may have been made available to the S-CSCF during registration of the respective temporary IMPU. Based on this information, the S-CSCF 38 may then update bindings for the registered public user identities (IMPU1, IMPU3) of the first terminal 10. In this regard, the S-CSCF may unbind the public user identities to the SIP contact address of the first terminal, the shared public user identity (IMPU3) no longer being bound to both the first and second terminals, but still being bound to the second terminal. The S-CSCF may then send a response flow, such as a 200 OK information flow, to the first terminal. It is possible that the HSS may send the S-CSCF 38 a relevant user profile including the public user identities in the implicit registration set (T-IMPU2, IMPU2, IMPU3) as a response to server assignment procedure.

In one exemplary embodiment, IMPU3 may have specific treatment compared to existing IMS functionality; and therefore, it may be beneficial to mark this type of identity in the user profile permanently stored at the HSS 34. To enable this, a new data type may be defined to identify which public user identities are shared by multiple implicit registration sets. For example and without limitation, this new data type could be called "tSharedidentity," and could include a number of SIP-URI or tel-URI data types and associated values of tSharedIFCSetID. For example, "tSharedidentity=tel:+358507777777; 1,2" may mean that tel:+358507777777 (tel-URI) is included in implicit registration sets numbered 1 and 2.

To further illustrate exemplary embodiments of the present invention, again consider the so-called family number concept, where the family includes at least a father (user1) and mother (user2). In such an instance, again consider that the father may have an associated, first implicit registration set including a temporary public user identity (T-IMPU1), a unique public user identity (IMPU1) and a shared public user identity (IMPU3). Similarly, the mother may have an associated, second implicit registration set including a temporary public user identity (T-IMPU2), a unique public user identity (IMPU2) and a shared, family public user identity (IMPU3). The unique public user identities (IMPU1, IMPU2) may be formed from unique MSISDNs, and the shared public user identity (IMPU3) may be formed from a shared MSISDN.

In accordance with exemplary embodiments of the present invention, the father may register with an IMS using his temporary public user identity (T-IMPU1). During the registration process, the IMS may register the other public user identities in the first implicit registration set, including the father's unique MSISDN and the family MSISDN (IMPU1, IMPU3). The father may then be accessible for communication services according to either his MSISDN or the family MSISDN. Similarly, the mother may register with an IMS using her temporary public user identity (T-IMPU2). During the registration process, the IMS may register the other public user identities in the second implicit registration set, including the mother's unique MSISDN and the family MSISDN (IMPU2, IMPU3). The mother may then be accessible for communication services according to either her MSISDN or the family MSISDN. Thus, while the father and mother may each receive communication requests to their respective MSISDNs, both may require communication requests to the family MSISDN.

According to one exemplary aspect of an embodiment of the present invention, the functions performed by one or more of the entities of the system, such as the terminal 10, application server 32, HSS 34, P-CSCF 36 or I/S-CSCF 38, may be performed by various means, such as hardware and/or firmware, including those described above, alone and/or under control of a computer program product. The computer program product for performing one or more functions of exemplary embodiments of the present invention includes a computer-readable storage medium, such as the non-volatile storage medium, and software including computer-readable program code portions, such as a series of computer instructions, embodied in the computer-readable storage medium.

In this regard, FIGS. 7 and 8 are control flow diagrams of systems, methods and program products according to exemplary embodiments of the present invention. It will be understood that each block or step of the control flow diagrams, and combinations of blocks in the control flow diagrams, may be implemented by various means, such as hardware, firmware, and/or software including one or more computer program instructions. As will be appreciated, any such computer program instructions may be loaded onto a computer or other programmable apparatus to produce a machine, such that the instructions which execute on the computer or other programmable apparatus (e.g., hardware) create means for implementing the functions specified in the block(s) or step(s) of the control flow diagrams. These computer program instructions may also be stored in a computer-readable memory that may direct a computer or other programmable apparatus to function in a particular manner, such that the instructions stored in the computer-readable memory produce an article of manufacture including instruction means which implement the function specified in the block(s) or step(s) of the control flow diagrams. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the control flow diagrams.

Accordingly, blocks or steps of the control flow diagrams support combinations of means for performing the specified functions, combinations of steps for performing the specified functions and program instruction means for performing the specified functions. It will also be understood that one or more blocks or steps of the control flow diagrams, and combinations of blocks or steps in the control flow diagrams, may be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
at least one processor; and
at least one memory including computer program code, the at least one processor, the at least one memory, and the computer program code configured to cause the apparatus to at least:
maintain a first implicit registration set for a first user of a first wireless terminal, the first implicit registration set including a first identity unique to the first wireless terminal and a shared identity, the first identity and the shared identity each comprising internet protocol multimedia subsystem identities;
maintain a second implicit registration set for a second user of a second wireless terminal, the second implicit registration set including a second identity unique to the second wireless terminal and the shared identity, the second identity comprising an internet protocol multimedia subsystem identity,
wherein the first and second implicit registration sets are maintained to enable registration of the first and second wireless terminals with a network, the first wireless terminal configured to receive communication requests to the first identity and the second wireless terminal configured to receive communication requests to the second identity, and both the first and second wireless terminals configured to receive communication requests to the shared identity,
wherein the first identity, the second identity, and the shared identity are public identities,
wherein when one of the public identities in at least one of the first implicit registration set and the second implicit registration set is registered, any remaining public identities in the at least one of the first implicit registration set and the second implicit registration set are registered, and
wherein during registration of the first and second wireless terminals according to the first and second implicit registration sets, a first temporary public user identity associated with the first wireless terminal and a second temporary public user identity associated with the second wireless terminal are barred from registration.

2. The apparatus of claim 1, wherein the first and second implicit registration sets are maintained at a subscriber information store.

3. The apparatus of claim 1, wherein the first identity and the second identity are unique circuit switched network identities.

4. The apparatus of claim 1, wherein the first user and the second user are different users of the network.

5. The apparatus of claim 1, further configured to at least:
receive a first register information flow from the first wireless terminal, and in response thereto, register the first wireless terminal with the network including binding the first identity and the shared identity to the first wireless terminal; and
receive a second register information flow from the second wireless terminal, and in response thereto, register the second wireless terminal with the network including binding the second identity and the shared identity to the second wireless terminal.

6. The apparatus of claim 5, further configured to at least:
bind the first identity and the shared identity to a first signaling-protocol contact address of the first wireless terminal; and
bind the second identity and the shared identity to a second signaling-protocol contact address of the second wireless terminal.

7. The apparatus of claim 5, further configured to at least:
receive a de-register information flow from at least one of the first wireless terminal and the second wireless terminal; and
de-register, in response to the receiving, the respective at least one of the first wireless terminal and the second wireless terminal with the network including unbinding the respective at least one of the first identity and the second identity and the shared identity from the respective at least one of the first wireless terminal and the second wireless terminal, the shared identity remaining bound to the other of the at least one of the first wireless terminal and the second wireless terminal.

8. The apparatus of claim 5, further configured to at least:
receive a communication request intended for the shared identity; and
forward, in response the receiving, the communication request to both the first and second wireless terminals such that both of the first and second wireless terminals receive the communication request at approximately the same time.

9. The apparatus of claim 1, further configured to at least: store the first identity and the second identity in memory.

10. A method comprising:
maintaining a first implicit registration set for a first of a first wireless terminal, the first implicit registration set including a first identity unique to the first wireless terminal and a shared identity, the first identity and the shared identity each comprising internet protocol multimedia subsystem identities; and
maintaining a second implicit registration set for a second user of a second wireless terminal, the second implicit registration set including a second identity unique to the second apparatus and the shared identity, the second identity comprising an internet protocol multimedia subsystem identity,
wherein the first and second implicit registration sets are maintained to enable registration of the first and second wireless terminals with a network, the first wireless terminal configured to receive communication requests to the first identity and the second wireless terminal configured to receive communication requests to the second identity, and both the first and second wireless terminals configured to receive communication requests to the shared identity,
wherein the first identity, the second identity, and the shared identity are public identities,
wherein when one of the public identities in at least one of the first implicit registration set and the second implicit registration set is registered, any remaining public identities in the at least one of the first implicit registration set and the second implicit registration set are registered, and
wherein during registration of the first and second wireless terminals according to the first and second implicit registration sets, a first temporary public user identity associated with the first wireless terminal and a second temporary public user identity associated with the second wireless terminal are barred from registration.

11. The method of claim 10, wherein the first and second implicit registration sets are maintained at a subscriber information store.

12. The method of claim 10, wherein the first identity and the second identity are unique switched network identities.

13. The method of claim 10, wherein the first user and the second user are different users of the network.

14. The method of claim 10 further comprising:
receiving a first register information flow from the first wireless terminal, and in response thereto, registering the first wireless terminal with the network including binding the first identity and the shared identity to the first wireless terminal; and
receiving first a register information flow from the second wireless terminal and, in response thereto, registering the second wireless terminal with the network including binding the second identity and the shared identity to the second wireless terminal.

15. The method of claim 14, wherein binding the first identity and the shared identity comprises binding the first identity and the shared identity to a first signaling-protocol contact address of the first wireless terminal, and wherein binding the second identity and the shared identity comprises binding the second identity and the shared identity to a second signaling-protocol contact address of the second wireless terminal.

16. The method of claim 14 further comprising:
receiving a de-register information flow from at least one of the first wireless terminal and the second wireless terminal; and
de-registering, in response to the receiving, the respective at least one of the first wireless terminal and the second wireless terminal with the network including un-binding the respective at least one of the first identity and the second identity and the shared identity from the respective at least one of the first wireless terminal and the second wireless terminal, the shared identity remaining bound to the other of the at least one of the first wireless terminal and the second wireless terminal.

17. The method of claim 14 further comprising:
receiving a communication request intended for the shared identity; and
forwarding, in response to the receiving, the communication request to both the first and second wireless terminals such that both of the first and second wireless terminals receive the communication request at approximately the same time.

18. A non-transitory computer-readable medium encoded with instructions that, when executed by at least one processor, perform at least the following:
receive a first implicit registration set for a first user of a first wireless terminal, the first implicit registration set including a first identity unique to the first wireless terminal and a shared identity, the first identity and the shared identity each comprising internet protocol multimedia subsystem identities;
receive a second implicit registration set for a second user of a second wireless terminal, the second implicit registration set including a second identity unique to the second wireless terminal and the shared identity, the second identity comprising an internet protocol multimedia subsystem identity; and
maintain the first and second implicit registration sets to enable registration of the first and second wireless terminals with a network, the first wireless terminal configured to receive communication requests to the first identity and the second wireless terminal configured to receive communication requests to the second identity, and both the first and second wireless terminals configured to receive communication requests to the shared identity,
wherein the first identity, the second identity, and the shared identity are public identities,
wherein when one of the public identities in at least one of the first implicit registration set and the second implicit registration set is registered, any remaining public identities in the at least one of the first implicit registration set and the second implicit registration set are registered, and
wherein during registration of the first and second wireless terminals according to the first and second implicit registration sets, a first temporary public user identity associated with the first wireless terminal and a second temporary public user identity associated with the second wireless terminal are barred from registration.

19. The non-transitory computer-readable storage medium of claim 18, wherein the first and second implicit registration sets are maintained at a subscriber information store.

20. The non-transitory computer-readable storage medium of claim 18, wherein the first user and the second user are different users of the network.

* * * * *